United States Patent Office 3,383,398
Patented May 14, 1968

3,383,398
PRODUCTION OF CARBOXYLIC ACIDS IN THE PRESENCE OF PYRIDINE
David W. Peck, Charleston, W. Va., and Lawrence W. Newton, Chappaqua, N.Y., assignors to Union Carbide Corporation, a corporation of New York
No Drawing. Continuation of application Ser. No. 433,188, Feb. 16, 1965. This application July 26, 1967, Ser. No. 656,295
8 Claims. (Cl. 260—413)

ABSTRACT OF THE DISCLOSURE

The reaction of an olefinically unsaturated compound containing a vinylene group (—CH=CH—) with ozone, when conducted in the presence of pyridine or an alkyl derivative thereof as a solvent, results in the conversion of each carbon atom of the vinylene group to a carboxyl group. Thus, cyclododecene, when reacted with ozone in the presence of pyridine, is converted directly to 1,12-dodecanedioic acid.

---

This application is a continuation of application Ser. No. 433,188, filed Feb. 16, 1965, and now abandoned.

This invention relates to an improved method for producing carboxylic acids via the ozonolysis of olefinically-unsaturated compounds. More particularly, this invention relates to a one-step process wherein olefinically-unsaturated compounds are reacted with ozone and converted directly to carboxylic acids.

It is well known that carboxylic acids can be produced via the ozonolysis of an olefin containing a hydrogen on each of the two carbon atoms forming the olefinic double bond, i.e., an olefin containing a vinylene group (—CH=CH—)

The product of the ozonolysis is an ozonide which can be decomposed under oxidative conditions, such as by reaction with hydrogen peroxide, to produce two carboxylic acid moieties, each containing one of the hydrogen-containing carbon atoms forming the double bond and present in the ozonide. This series of reactions can be illustrated by the following schematic equations:

(1) Ozonolysis

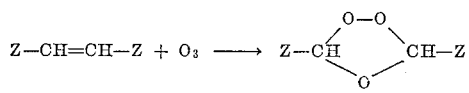

(2) Oxidative cleavage

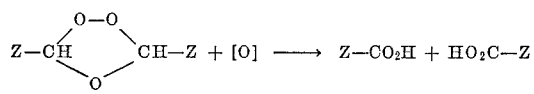

wherein each Z is a monovalent organic radical or both Z's, when taken together, form a divalent organic radical.

Thus, the reaction proceeds by conversion of the vinylene group (—CH=CH—) of the olefin to a 1,2,4 - trioxolane - 3,5 - ylene group

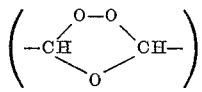

or ozonide group, followed by conversion of each of the hydrogen-containing carbon atoms of the vinylene and ozonide groups to carboxyl groups (—CO$_2$H). The reaction product can be one or more carboxylic acid compounds, depending upon the number and position of the olefinic double bond. For example, a monoolefin containing the double bond in a cyclic structure, for example cyclohexene, is converted to a diacid, e.g., adipic acid. On the other hand, a monoolefin containing the double bond in an open-chain structure yields two carboxylic acids which may be the same or different, depending upon the moieties satisfying the valences of the vinylene group of Equation 1 above. If the moieties are identical, only one product acid is recovered, and, if they are different, two different product acids are produced. Examples of reactions of this type include the conversion of monoolefinic alicyclic hydrocarbons to diacids, e.g., cyclohexene to adipic acid and cyclooctene to suberic acid; the conversion of oleic acid to azelaic and pelargonic acids; the conversion of propenyl benzene to benzoic and acetic acids; the conversion of 6 - hexadecene to caproic and capric acids; the conversion of 8 - hexadecene to caprylic acid, and the like.

As is well known, the olefinic compound can contain more than one olefinic double bond and may contain various substituents. Thus, β - hydromuconic acid is converted to malonic acid and cyclooctatetraene is converted, through its isomer bicyclo[4.2.0]octatriene, to succinic acid and 1,1,2,2 - ethanetetracarboxylic acid.

It has been found by this invention that a solvent system consisting predominantly of a pyridine compound, as hereinafter defined, promotes the cleavage of the ozonide group, and, if the cleavage is effected in the presence of ozone, each carbon atom of the ozonide group is converted to a carboxyl group. Moreover, if the ozonolysis of the vinylene group is effected in such a solvent system, each carbon atom of the vinylene group is converted directly to a carboxyl group.

The ability of pyridine compounds to promote the formation of acids is especially unexpected and surprising in view of the disclosures of Heyl et al., JACS, 69, 1957–61 (1947), and Slomp et al., JACS, 80, 915–21 (1958), that small amounts of pyridine, when present during the ozonolysis of an olefin in chloroform or methylene chloride as solvents, suppress the formation of acids and promote the formation of aldehydes. The reasons for the different results obtained by applicants are not fully understood, but it is believed that the pyridine compound should be present in the solvent system employed in the ozonolysis in a major amount. That is, the solvent system should contain at least about 40 weight percent of a pyridine compound, and that as the amount of pyridine compound in the solvent system decreases below about 40 percent its ability to promote carboxyl formation is masked by the balance of the solvent system.

The pyridine which are employed in the process of this invention are pyridines and its alkyl-substituted derivatives of up to about 10 carbon atoms. These monocyclic pyridines can be considered of as consisting of one nitrogen atom, from 5 to 10 carbon atoms and sufficient hydrogen to provide a compound having no unsaturation except in the heterocyclic pyridine ring thereof. These compounds are represented by the formula:

(I)

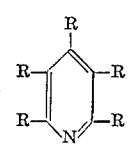

wherein each R is hydrogen or alkyl of from 1 to 5 carbons, with the proviso that the total number of carbons in the alkyl groups does not exceed five. Preferred pyridines are represented by the formula:

(II)

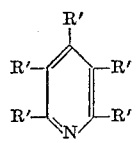

wherein each R', when taken separately, has the formula $-C_nH_{2n+1}$ wherein $n$ is an integer having a value of from 0 to 2. Illustrative of suitable pyridine compounds are pyridine, the picolines, the lutidines, 2-methyl-5-ethylpyridine, and the like.

The promoting amount of pyridine compound is not highly critical, and weight ratios of pyridine compound to olefinic compound of from about 0.5:1 or lower up to about 10:1 or higher can be successfully employed. Optimum results are obtained when the ratio is in the range of from about 1:1 to 3:1, with a ratio of about 2:1 being especially preferred.

Although not essential, it is preferred that water also be present in the reaction system to provide improved yields and a purer product. Although amounts of up to about 150 weight percent, based on pyridine compound, can be employed if desired, amounts in the range of from about 10 to about 80 weight percent, based upon pyridine compound, are preferred.

The remaining reaction conditions are not highly critical to the process of this invention, and will be readily apparent to or determinable by one skilled in the art. Thus, the reaction is normally conducted at atmospheric pressure, although higher and lower pressures can be employed if desired. The reaction temperature can vary widely, for example from 0° C. to 100° C., although temperatures in the range of about 20° C. to about 50° C. are normally employed.

The ozone is contacted with the olefin-pyridine reaction mixture in any suitable manner. Most commercially-available ozonators supply a stream containing from about 1 to about 5 percent ozone in air or oxygen, and streams of this nature are suitable.

The amount of ozone is not highly critical to this invention, and can be as low as 1 mole of ozone per molar equivalent of olefin or even lower. It is preferred, however, to supply at least the stoichiometric amount of ozone required to produce the ozonide and convert the ozonide group to two carboxyl groups; that is, at least 1.33 moles of ozone per molar equivalent of olefin. Although the amount of ozone can be as high as 2 moles of ozone per molar equivalent of olefin, or even higher, it is not desirable, for the excess ozone reacts with the pyridine compound, thereby reducing the efficiency and economic feasibility of the ozonolysis. Amounts of from about 1.4 to about 1.7 moles per molar equivalent of olefin are preferred. By the term "molar equivalent of olefin" is meant the number of moles of olefin times the number of ozonizable vinylene groups present in the olefin. Thus, one mole of a diolefin comprises two molar equivalents of olefin.

The products of the process of this invention are recovered by conventional techniques, such as extraction, distillation, recrystallization, and the like. A preferred technique when the desired acid product is a relatively high boiling compound is to flash evaporate the reaction product to remove the pyridine compound and water, if present, which may be recycled to the reaction. The residue is then washed with a hydrocarbon, preferably a non-aromatic hydrocarbon such as pentane, hexane, cyclohexane, heptane, and the like. Aromatic hydrocarbons, such as benzene and toluene, can be employed if desired, but the product acids tend to be more soluble in the aromatic hydrocarbons than the non-aromatic hydrocarbons. The hydrocarbon-washed material is then washed with water which, if a high degree of purity is desired, can be followed by recrystallization from a suitable solvent, for example benzene or aqueous nitric acid.

Although the process of this invention is applicable to all reactions in which an olefin can be reacted with ozone to convert both of the carbon atoms of the vinylene group to carboxyl group, it is especially applicable to monoolefinically-unsaturated aliphatic and cycloaliphatic compounds having no unsaturation other than one vinylene group and containing up to about 20 carbon atoms. Suitable olefins in this group include aliphatic monoolefins such as ethylene, propylene, butene, hexene, dodecene, hexadecene, eicosene, and the like; alicyclic monoolefins such as cyclopentene, cyclohexene, cyclooctene, cyclododecene, and the like; and monoolefinically unsaturated aliphatic monocarboxylic acids and their lower alkyl esters such as oleic acid, methyl oleate, linoleic acid, methyl linoleate, and the like.

The following examples are illustrative.

EXAMPLE 1

A mixture of a crude oleic acid ozonide produced by the ozonolysis of oleic acid and pyridine was charged to a test tube and the test tube was immersed in a constant temperature bath maintained at 50° C. The resulting mixture was titrated for ozonide periodically and, after about 1 hour, the ozonide was essentially completely decomposed. Similar results were obtained when methyl ethyl pyridine was substituted for pyridine. When the ozonide alone was charged to the test tube no decomposition was observed even after 4 hours.

EXAMPLE 2

A stream of oxygen containing about 4 percent ozone was passed through a charge containing 100 grams of oleic acid, 200 grams of pyridine and 30 grams of water, which was heated at 50° C. Several duplicate runs were conducted, but were terminated at different levels of ozone input to the reaction mixture. The product acids were recovered by stripping the reaction product under reduced pressure to remove pyridine and water followed by a vacuum distillation to recover pelargonic acid. The distillation residue was extracted with hot water and azelaic acid was recovered on evaporation of the water from the aqueous extract. The results of these runs are summarized in Table I.

TABLE I

| Run No. | Ozone Charged, percent of Theoretical | Yields, percent | |
|---|---|---|---|
| | | Azelaic Acid | Pelargonic Acid |
| 1 | 73 | 49 | 42 |
| 2 | 109 | 64 | 55 |
| 3 | 139 | 71 | 59 |
| 4 | 141 | 68 | 68 |
| 5 | 151 | 67 | 73 |
| 6 | 176 | 67 | 64 |

As can be seen from the data presented above, optimum yields of azelaic and pelargonic acids are obtained when about 40–50 percent excess ozone is employed, based on the theoretical amount necessary to convert all of the oleic acid charged to its ozonide. Maximum yields of the product acids are obtained at this level, and yields are not significantly increased with additional ozone.

EXAMPLE 3

A stream of 3.5% ozone in oxygen was passed through a mixture of 45 grams (0.2 mole) of 1-hexadecene, 100 grams of pyridine and 15 grams of water at 28–31° C. until 14 grams (0.29 mole) of ozone had been added. After flash evaporation of the reaction product to remove pyridine and water and then washing the residue with aqueous hydrochloric acid, there were recovered 46 grams (0.19 mole) of pentadecanoic acid, m. 45–47° C., for a yield of 95 percent. After recrystallization from pentane the melting point of the product acid was 50.5–51.5° C., as compared with the literature value of 51–53° C.

EXAMPLE 4

A stream of 3.5 percent ozone in oxygen was passed through a mixture of 18 grams of cyclohexene, 100 grams of pyridine and 15 grams of water at 28–31° C. until 14 grams of ozone had been added. After flash evaporation and washing the residue with 100 ml. of benzene and then two 100 ml. portions of pentene, there were recovered 18 grams of adipic acid, m. 137–50°C. On recrystallization from aqueous nitric acid the melting point of the adipic acid was 151–2° C. compared with the literature value of 151–3° C.

EXAMPLE 5

A stream of 3.5 percent ozone in oxygen was passed through a solution of 22 grams of cyclooctene, 120 grams of pyridine, and 15 grams of water at 42–56° C. until 14 grams of ozone had been added. After flash evaporation and slurrying the residue first in pentane, then in water, there were recovered 19 grams of suberic acid melting at 139.5–140.5° C., as compared with the literature value of 140° C.

EXAMPLE 6

A stream of 1.3 percent ozone in air was passed through a solution of 100 grams of 86 percent cyclododecene (0.52 mole) in cyclododecane, 200 grams of pyridine, and 30 grams of water at 27–37° C. until a total of 37 grams (0.77 mole) of ozone had been added. After flash evaporation at 20 mm. pressure to remove pyridine and water, recrystallization of the residue from benzene and a pentane wash, there were recovered 67 grams of crude 1,12-dodecanedioic acid. After water-washing, there were obtained 59 grams of the diacid, m. 125–6° C. Recrystallization of a small sample increased the melting point to 127–8° C.

The mother liquor from the recrystallization from the benzene was evaporated to dryness and the solids, after washing with pentane, were found to be 48 grams of crude diacid. After water-washing twice, there were obtained 43 grams of diacid, m. 123–5°C.

EXAMPLE 7

A stream of 3.5 percent ozone in oxygen was passed through a solution of 33 grams of 85% cyclododecene in cyclododecane (0.17 mole cyclodocene), 67 grams of pyridine and 10 grams of water at 28–31° C. until 14 grams (0.29 mole) of ozone was added. The reaction product, which weighed 122 grams, was flash evaporated to remove 48 grams of pyridine and water. The residue was slurried in pentane and then water to provide 31 grams of 1,12-dodecanedioic acid melting at 124–6° C., representing a yield of 80 percent. Employing similar techniques, several additional runs were conducted employing different reaction conditions. The data for these runs are summarized in Table II, with the data for the above described run being included as Run No. 1.

A comparison of Runs 1 and 2 illustrates the superiority of pyridine over alkyl-substituted pyridines, such as 2-methyl-5-ethylpyridine, in providing good yields of high purity diacid, and Runs 1 and 3–5, when compared, show the necessity of maintaining water in the solvent system to obtain high yields of high purity acid. A comparison of Runs 1 and 6 discloses that a slight improvement in yield is obtained at slightly higher temperatures, and Run 7, when compared with Run 1, illustrates that a slight improvement in yield of acid is obtained when the molar ratio of ozone to cyclododecene is increased from about 1.7 to about 2.4. Run 8, when compared with Run 1, shows that a purer feed stock results in improved yields of acid, and Run 9, when compared with Run 1, indicates that the use of benzene to purify the crude ozonolysis residue results in a considerable loss of acid.

What is claimed is:

1. In the process for the cleavage of an olefinic double bond contained in a vinylene group of an olefinically-unsaturated aliphatic or alicyclic compound containing up 20 carbon atoms with ozone to produce a product wherein each carbon atom of said vinylene group is converted to a carboxyl group, the improvement of effecting the reaction of said olefinically-unsaturated compound with ozone in the presence of solvent system consisting essentially of (1) a monocyclic pyridine consisting of one nitrogen atom, from 5 to 10 carbon atoms and sufficient hydrogen to provide a pyridine having no unsaturation except in the heterocyclic ring thereof, and (2) up to about 150 weight percent, based on said pyridine, of water, said pyridine being present in an amount sufficient to promote the formation of said carboxyl groups.

2. In the process for the cleavage of the olefinic double bond contained in a vinylene group of a monoolefinically-unsaturated aliphatic monocarboxylic acid containing up to 20 carbon atoms free from unsaturation other than one vinylene group with ozone to produce a product wherein each carbon atom of said vinylene group is converted to a carboxyl group, the improvement of effecting the reaction of said olefinically-unsaturated compound with ozone in the presence of solvent system consisting essentially of (1) a monocyclic pyridine consisting of one nitrogen atom, from 5 to 10 carbon atoms and sufficient hydrogen to provide a pyridine having no unsaturation except in the heterocyclic ring thereof, and (2) from about 10 to about 80 weight percent, based on said pyridine, of water, said pyridine being present in an amount such that the weight ratio of said pyridine compound to said acid is from about 0.5:1 to about 10:1.

3. The process as claimed in claim 2 wherein said acid is oleic acid.

4. In the process for the cleavage of the olefinic double bond contained in a vinylene group of a monoolefinically-unsaturated aliphatic or alicyclic hydrocarbon containing up to 20 carbon atoms free from aliphatic unsaturation other than one vinylene group with ozone to produce a product wherein each carbon atom of said vinylene group

TABLE II

| Run No. | Reaction Conditions | | | | | Product | |
|---|---|---|---|---|---|---|---|
| | Charge, gm. | | | Ozone Cyclododecene Mole Ratio | Temp., °C. | Yield, percent | Melting Point, °C. |
| | Cyclododecene | Pyridine | Water | | | | |
| 1 | 33 | 67 | 10 | 1.7 | 28–31 | 80 | 124–6 |
| 2 | 33 | [1] 67 | 10 | 1.7 | 28–59 | 85 / [2] 70 | 119–22 / 126–7 |
| 3 | 33 | 54 | 23 | 1.7 | 27–35 | 91 | 126.5–7.5 |
| 4 | 51 | 100 | 100 | 1.7 | 28–36 | 87 | 121–3 |
| 5 | 33 | 77 | 0 | 1.7 | 26–37 | 74 / [2] 59 | 115–9 / 122–3.5 |
| 6 | 33 | 67 | 10 | 1.7 | 45–55 | 88 | 125.5–126 |
| 7 | 33 | 67 | 10 | 2.4 | 26–9 | 87 | 124.5–125 |
| 8 | [3] 33 | 67 | 10 | 1.7 | 22–54 | 96 | 126–6.5 |
| 9 | 33 | 67 | 10 | 1.7 | 28–29 | [4] 62 | 129–30 |

[1] 2-methyl-5-ethylpyridine substituted for pyridine.
[2] After recrystallization from benzene.
[3] 97% pure cyclododecene.
[4] The residue from the flash distillation was slurried first in 74 ml. of benzene and then in two 50-ml. portions of pentane.

is converted to a carboxyl group, the improvement of effecting the reaction of said olefinically unsaturated compound with ozone in the presence of solvent system consisting essentially of (1) a monocyclic pyridine consisting of one nitrogen atom, from 5 to 10 carbon atoms and sufficient hydrogen to provide a pyridine having no unsaturation except in the heterocyclic ring thereof, and (2) from about 10 to about 80 weight percent, based on said pyridine, of water, said pyridine being present in an amount such that the weight ratio of said pyridine compound to said hydrocarbon is from 0.5:1 to about 10:1.

5. The process as claimed in claim 4 wherein said alicyclic hydrocarbon is cyclohexene.

6. The process as claimed in claim 4 wherein said alicyclic hydrocarbon is cyclooctene.

7. The process as claimed in claim 4 wherein said alicyclic hydrocarbon is cyclododecene.

8. The process as claimed in claim 4 wherein said aliphatic hydrocarbon is 1-hexadecene.

References Cited

UNITED STATES PATENTS 3,238,250    3/1966    Bailey _____ 260—514

NICHOLAS S. RIZZO, *Primary Examiner.*

J. A. NARCAVAGE, *Assistant Examiner.*